Patented Oct. 18, 1932

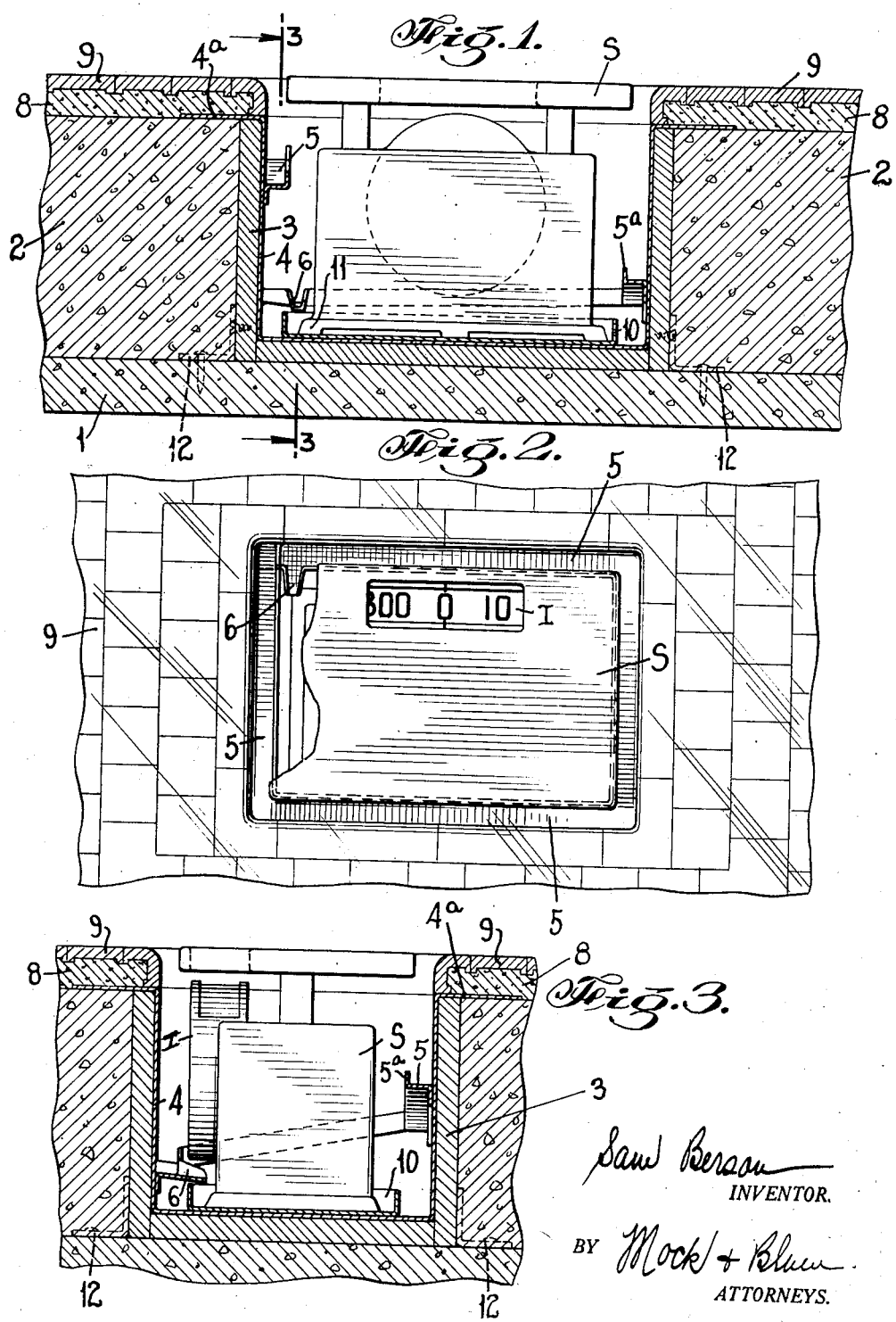

1,883,496

UNITED STATES PATENT OFFICE

SAM BERSON, OF NEW YORK, N. Y.

COMBINATION FLOOR AND SCALE CONSTRUCTION

Application filed February 16, 1931. Serial No. 516,123.

My invention relates to a new and improved combination floor and scale construction.

One of the objects of my invention is to provide a combination structure by means of which a scale of any suitable type (preferably a small portable scale) can be conveniently located within, and can be conveniently removed from, a recess in the floor of a bathroom or the like.

Another object of my invention is to provide a construction by means of which the scale can be conveniently countersunk in the floor of a bathroom or the like, so that the top of the scale is substantially flush with the top of the floor.

Another object of my invention is to prevent water from coming into contact with the scale and to provide a construction by means of which any water which drips into the recess in which the scale is located, can be conveniently removed.

Another object of my invention is to provide a construction which shall be particularly applicable to tiled bathroom floors, so that a recess is provided in which a small portable scale of the well known type can be conveniently located.

Other objects of the invention are set forth in the following description and drawing which illustrate preferred embodiments thereof, it being understood that the above statement of the objects of my invention is intended to generally explain the same and not to limit it in any manner.

Fig. 1 is a sectional view, the scale being shown in elevation.

Fig. 2 is a top plan view.

Fig. 3 is a sectional view on the line 3—3 of Fig. 1.

It has been well known to provide small portable scales for use in a bathroom. However, a scale of this type was merely placed upon the floor of the bathroom, so that its use was inconvenient and even dangerous, especially if a child was using the scale. It is always possible for the scale to tip over and in addition the scale provided an undesirable obstruction.

According to my invention a scale, which is preferably a small portable scale of any well known type, is located in a recess which is provided in the floor of the bathroom, so that the scale substantially fills said recess and the platform of the scale is substantially flush with the top of the floor. It is therefore impossible for the scale to tip over and the scale does not present an inconvenient and dangerous obstruction.

As shown in the drawing, the floor 1 has a foundation or base of any suitable type. This foundation or base 1 may be made of concrete or any other suitable material. A box 3 which is made of any suitable material is connected to the base 1 by means of angular brackets 12. These brackets 12 may be made of any suitable metal and they may be connected to the box 3 by any suitable fastening device. The box 3 may be made of any suitable material, such as wood, which may be rendered water-proof and which may be prevented from rotting under the action of water, by any well known treatment.

I prefer to retain the box 3 in the completed structure, but this is not necessary because the box 3 may be removed after it has served as a form for producing the recess in the floor of the bathroom. Likewise, the box 3 may be made of any suitable material, such as any suitable metal or the like.

Additional concrete or other suitable material is poured upon the base 1 while the box 3 is in position, and the tile facing 9 is then connected to the layer 2 by means of an intermediate layer 8 of any suitable material, such as concrete or the like.

I do not wish to be limited to any particular method of constructing the floor of the room, because this may vary in rooms of different type, and the construction desired by the builder.

The box 3 is provided with a metal lining 4 having a flange 4a which is united to the layers 2 and 8. Hence, the recess in the floor has a water-proof metal lining, the interior wall of which is flush with the interior wall of the upper part of the recess.

The metal lining 4 is provided with an inclined ramp 5, having a lip 5a so that if any water drips over the wall of the recess, it will travel down the ramp 5 and pass through the spout 6, into the collecting pan 10.

The scale S has the upper or platform part thereof substantially flush with the top surface of the tiles 9. This scale has a base 11 which is located in the pan 10. The scale S is sufficiently large so that any substantial tipping thereof is prevented by the interior wall of the recess, so that the scale is always out of the way and it can be used without any danger.

In order to remove the water from the pan 10, it is merely necessary to remove the scale S and it is then possible to readily remove and empty the pan 10. The scale S is provided with a drum I or with any other suitable means for indicing the weight of the person using the device.

I have shown a preferred embodiment of my invention, but it is clear that numerous changes and omissions can be made without departing from the spirit of my invention.

I claim:

1. In combination, a floor having a vertical recess, the vertical wall of said recess having collecting means adapted to collect water which enters said recess, a pan located at the bottom of said recess and communicating vith said collecting means, and a scale having its base located within said pan.

2. In combination, a floor having a recess, and a scale located within said recess and water intercepting means provided within said recess on the vertical wall thereof.

3. In combination, a floor having a vertical recess, the vertical wall of said recess having water intercepting means adapted to collect water which enters said recess, and a pan it the bottom of said recess, and a scale located within said pan.

4. In combination, a floor having a recess therein and a portable scale located in said recess, said scale being unattached to the wall of said recess, and a pan located in the base of said recess, said scale resting on said pan, and water intercepting means within said recess and communicating with said pan.

In testimony whereof I affix my signature.

SAM BERSON.